T. H. SHELDON.
ELECTRICALLY CONTROLLED AIR RELEASING VALVE FOR TRAIN PIPES AND THE LIKE.
APPLICATION FILED JAN. 4, 1913.
1,095,935.                                        Patented May 5, 1914.
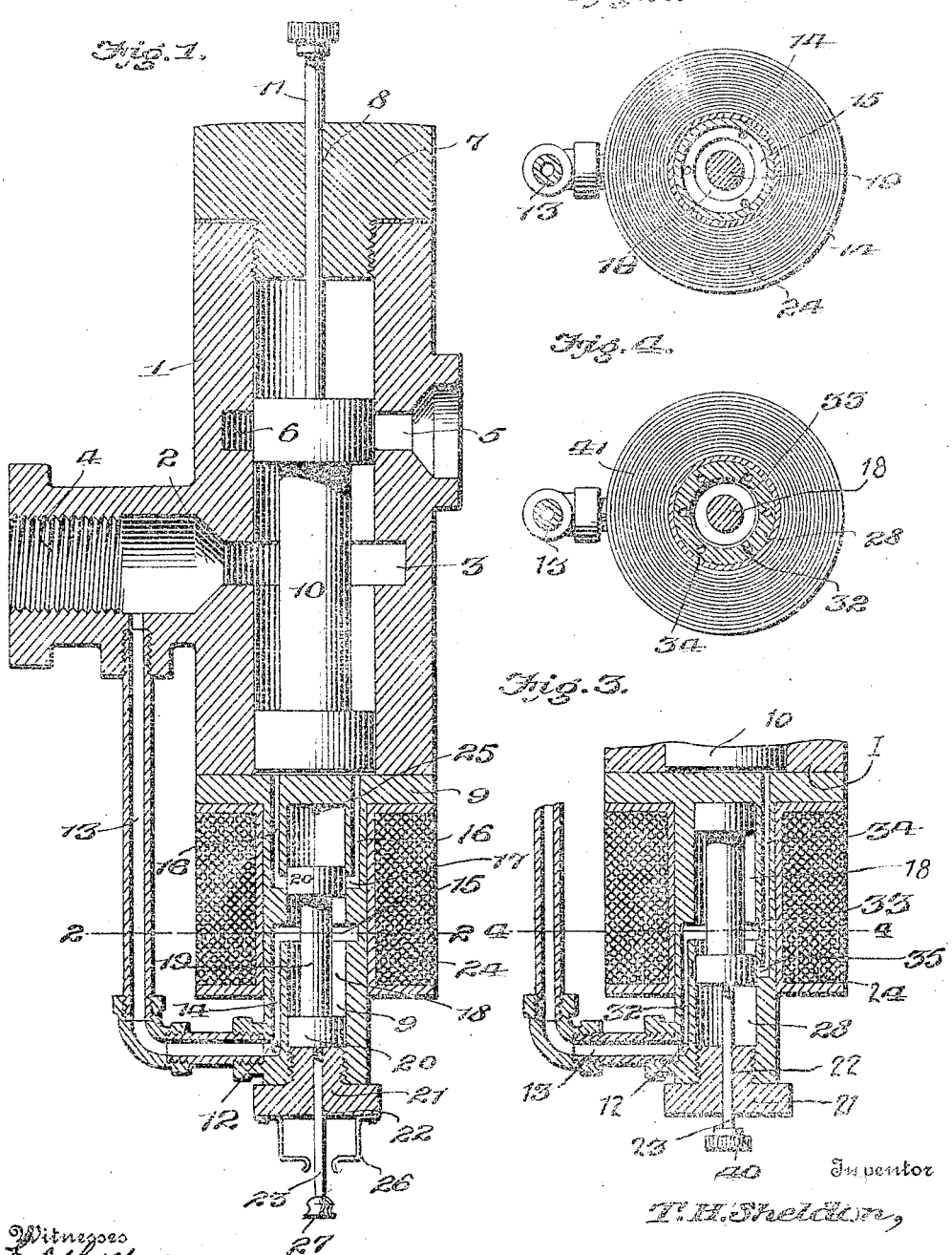

UNITED STATES PATENT OFFICE.

THOMAS H. SHELDON, OF VICTOR, COLORADO, ASSIGNOR OF ONE-HALF TO FELIX HERZ, OF GOLDFIELD, COLORADO.

ELECTRICALLY-CONTROLLED AIR-RELEASING VALVE FOR TRAIN-PIPES AND THE LIKE.

1,095,935. Specification of Letters Patent. Patented May 5, 1914.

Application filed January 4, 1913. Serial No. 740,245.

*To all whom it may concern:*

Be it known that I, THOMAS H. SHELDON, a citizen of the United States, residing at Victor, in the county of Teller and State of Colorado, have invented certain new and useful Improvements in Electrically-Controlled Air-Releasing Valves for Train-Pipes and the like; and I do declare the following to be a full, clear, and exact description of the invention such as will enable others skilled in the art to which it appertains to make and use the same.

This invention relates to improvements in electrically controlled air releasing valves for train pipes and the like.

One object of the invention is to provide a valve of this character having an improved construction and arrangement of electrically controlled operating mechanism whereby the valve may be opened for releasing the air from a train pipe or other device.

Another object is to provide a valve of this character which will be simple, strong and durable in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings: Figure 1 is a central longitudinal section of my improved valve; Fig. 2 is a cross sectional view thereof on the line 2—2 of Fig. 1; Fig. 3 is a detail longitudinal section of one end of the valve showing a modified construction and arrangement of the same; Fig. 4 is a cross sectional view taken on the line 4—4 of Fig. 3.

Referring more particularly to the drawings 1 denotes the main casing of my improved valve, said casing having on one side substantially midway between its ends an air inlet port 2 which communicates at its inner end with an annular groove 3 formed in the inner side of the valve casing and at its outer end connects with an interiorly threaded socket 4 formed on one side of the valve casing as shown. Also formed in the valve casing and preferably in the opposite side thereof from the port 2 is an air discharge port 5 which communicates at its inner end with an annular groove 6 formed in the inner side of the valve casing as shown. The outer end of the valve casing 1 is closed by a threaded plug 7 having therein a centrally disposed guide passage 8. The opposite end of the main valve casing 1 is closed by a supplemental valve casing 9 hereinafter described.

Slidably mounted in the main valve casing 1 is a main air releasing valve 10 having on one end a stem 11 which works through the passage 8 and is provided for the purpose of manually closing or re-setting the valve 10 after the same has been automatically operated in the manner hereinafter described.

The supplemental valve casing 9 has formed therein near its lower end an air inlet port 12 which is connected by an air conducting pipe 13 with the socket 4 of the air inlet port 2 of the main valve casing whereby a portion of the air entering the socket 4 from the train pipe passes into the supplemental valve casing 9. The inner end of the air inlet port 12 communicates with the lower ends of a series of inwardly extending air passages 14 the inner ends of which connect with an annular groove 15 formed in the inner side of the supplemental valve casing substantially midway between its ends as shown. In the inner portion of the valve casing 9 are formed a series of air passages 16 the outer ends of which communicate with an annular groove 17 formed in the inner side of the valve casing a suitable distance from the groove 15 as shown. The inner ends of the air passages 16 communicate with the inner end of the main valve casing 1 whereby the air passing through the supplemental valve casing 9 and through the passages 16 acts upon the main valve 10 and forces the same outwardly in the main valve casing thereby uncovering the groove 6 and opening the discharge port 5 thus releasing the air from the train pipe.

The groove 17 and outer ends of the air passages 16 are normally closed by a supplemental valve 18 arranged in the supplemental valve casing 9. The valve 18 is also preferably in the form of a spool valve or has a reduced central portion 19 and on its ends, heads 20 one of which when the valve is closed covers the grooves 17 as shown.

The air entering the valve chamber through the passages 14 and groove 15 fills the space around the reduced central portion of the valve and between the heads thereof so that when the valve is shifted inwardly to a sufficient extent to uncover the groove 17 and outer ends of the passage 16 the air entering the valve chamber around the reduced portion of the valve will pass out through the groove 17 and passages 16 into the main valve casing thereby operating the main valve in the manner described. The outer end of the supplemental valve casing 9 is closed by a screw plug 21 having therein a centrally disposed guide passage 22 in which is slidably mounted the stem 23 of the valve 18 and by means of which said valve is manually closed or re-set after having been shifted to an open position.

The supplemental valve casing 9 forms the core of a solenoid 24 which when energized attracts the valve 18 and draws the same upwardly in the supplemental valve casing thereby uncovering the groove 17 and outer ends of the passages 16 in the manner described. In order to prevent any air which may have worked past the valve 18 into the inner portion of the casing from exerting a back pressure on the valve and thus interfering with the operation of the same I provide the inner portion of the supplemental valve casing with a vent or relief port 25 whereby air may escape from between the inner end of the valve 18 and the inner end of the valve casing. Connected with the plug 21 which closes the outer end of the supplemental valve casing are spring valve holding arms 26 which converge inwardly toward their lower ends and have their extremities turned outwardly as shown. The outer end of the valve stem 23 has thereon a suitably shaped head 27 which when the valve is shifted to an open position is brought between or into engagement with the outer ends of the spring arms 26 which thus grip the valve stem and hold the valve in an open position until the same is manually closed.

In the form of the invention shown in Figs. 1 and 2 of the drawing the supplemental air controlling valve 18 has been shown and described as being operated and opened by the action of the solenoid 24 on the casing of this valve. In Figs. 3 and 4 of the drawings is shown a slightly different construction and arrangement of a supplemental air controlling valve which in this instance is normally held in a closed position by the solenoid as long as the latter is energized but as soon as the same is deenergized the valve will drop by gravity to an open position. In the form of the valve shown in Figs. 3 and 4 the supplemental valve casing 28 is connected to the lower end of the valve casing 1 in the same manner as shown and described in the first form of the invention and said main valve casing 1 and main valve 10 therein are constructed and arranged in the same manner as the main valve casing and valve shown in Fig. 1. In the embodiment illustrated in Figs. 3 and 4 the air inlet 12 is connected at its inner end with the lower ends of a series of inwardly extending air passages 32 the inner ends of which are connected with an annular groove 33 formed in the inner side of the valve casing 28. In the inner portion of the supplemental valve casing 28 is formed an annular series of air discharging passages 34 the outer ends of which communicate with an annular groove 35 formed in the inner side of the valve casing 28 between the groove 33 and the outer end of the valve casing. The inner ends of the passages 34 open through the inner end of the supplemental valve casing and communicate with the adjacent end of the main valve casing 1 whereby the air discharging through the passages 34 enters said main valve casing and actuates the main valve 10 in the same manner and for the same purpose as described in the first form of the invention. The spool valve 18 when in its normal position closes the groove 35 and outer ends of the air discharging passages 34, said groove 35 and passages 34 being open when the valve drops or moves to a position in engagement with plug 21. The outer end of the valve stem 22 has secured thereto a button 40 by means of which the valve may be manually operated and reset. When the solenoid 24 is energized, the valve 18 is held in a closed position as shown. As soon as the solenoid is deënergized the valve 18 will drop by gravity in the valve casing 28 thereby permitting the air entering the valve casing through the pipe 13 to pass into the inner end of the main valve casing to operate the main valve in the manner described.

From the foregoing description taken in connection with the accompanying drawings the operation and construction of the invention will be understood without further explanation.

Having thus described my invention, what I claim is:

1. A valve of the character described comprising a main valve casing having therein air-inlet and discharge ports, a socket formed on one side of the main valve casing and communicating with said inlet port whereby air is admitted to the casing, a plug to close the outer end of said main valve casing, said plug having therein a guide passage, an air releasing valve mounted in said main valve casing and adapted to normally close the discharge port therein, a stem connected with said valve and adapted to work through the guide passage in the plug whereby said air releasing valve may be manually operated and reset, a supplemental valve casing of less diameter than the main valve casing and connected with the inner end of said main valve casing, said supplemental valve casing having therein an air inlet port, a series of air inlet passages communicating with said air inlet port, a series of air discharging passages, the latter passages communicating with the inner end of the main valve casing, an air conducting pipe to connect the air inlet port of the supplemental valve casing with the socket on said main valve casing, whereby a portion of the air entering the main valve casing is conducted to the supplemental valve casing, a plug to close the outer end of said supplemental valve casing, said plug having therein a guide passage, an air controlling valve slidably mounted in said supplemental valve casing and normally closing the air discharge passages therein, a stem on said supplemental valve and having its outer portion sliding through the guide passage in said plug, whereby the supplemental valve may be manually reset, a solenoid surrounding the reduced supplemental valve casing and adapted to control said supply valve, and an operating head on the outer end of the stem of the supplemental valve.

2. A valve of the character described comprising a main valve casing having therein air inlet and discharge ports, a socket formed on one side of said main valve casing and communicating with said inlet port whereby air is admitted to said casing, a plug to close the outer end of said main valve casing, said plug having therein a guide passage, an air releasing valve slidably mounted in said main valve casing and adapted to normally close the discharge port therein, a stem connected with said valve and adapted to work through the guide passage in said plug whereby said air releasing valve may be manually operated and re-set, a supplemental valve casing connected with the inner end of the main valve casing and having therein an air inlet port, a series of air inlet passages, and a series of air discharging passages, said air discharging passages communicating with the inner end of the main valve casing, an air conducting pipe to connect the air inlet port of said supplemental valve casing with the socket on said main valve casing whereby a portion of the air entering the main valve casing is conducted to the supplemental valve casing, a plug to close the outer end of said supplemental valve casing, said plug having therein a guide passage, a supplemental air controlling valve slidably mounted in said supplemental valve casing and adapted to normally close the outer ends of said air discharging passages, a stem on said supplemental valve and having its outer portion sliding through the guide passage in said plug whereby said supplemental valve may be manually re-set, a solenoid arranged on said supplemental valve casing and adapted when energized to attract said supplemental valve and to shift the latter to an open position, and spring arms to engage the stem of said supplemental valve and to hold the latter in an open position.

In testimony whereof I have hereunto set my hand in presence of two subscribing witnesses.

THOMAS H. SHELDON.

Witnesses:
   CHAS. CRATHERIDGE,
   F. M. GLENN.